United States Patent
Lochhaas et al.

(10) Patent No.: US 10,087,307 B2
(45) Date of Patent: Oct. 2, 2018

(54) PEROXIDE CURABLE FLUOROPOLYMERS OBTAINABLE BY POLYMERIZATION USING NON-FLUORINATED POLYHYDROXY EMULSIFIERS

(71) Applicant: 3M INNOVATIVE PROPERTIES COMPANY, St. Paul, MN (US)

(72) Inventors: Kai Helmut Lochhaas, Neuötting (DE); Klaus Hintzer, Kastl (DE); Tilman C. Zipplies, Burghausen (DE); Harald Kaspar, Burgkirchen (DE); Florian D. Jochum, Neuötting (DE); Helmut Traunspurger, Julbach (DE); Arnd Kruz, Neuss (DE); Peter Bissinger, Diessen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 19 days.

(21) Appl. No.: 15/033,301

(22) PCT Filed: Oct. 29, 2014

(86) PCT No.: PCT/US2014/062878
§ 371 (c)(1),
(2) Date: Apr. 29, 2016

(87) PCT Pub. No.: WO2015/066166
PCT Pub. Date: May 7, 2015

(65) Prior Publication Data
US 2016/0272782 A1    Sep. 22, 2016

(30) Foreign Application Priority Data

Oct. 30, 2013    (EP) .................................. 13190890

(51) Int. Cl.
| | | |
|---|---|---|
| *C08K 5/14* | (2006.01) | |
| *C08K 3/30* | (2006.01) | |
| *C08K 5/1545* | (2006.01) | |
| *C08F 214/22* | (2006.01) | |
| *C08K 5/17* | (2006.01) | |

(52) U.S. Cl.
CPC .......... *C08K 5/1545* (2013.01); *C08F 214/22* (2013.01); *C08F 214/222* (2013.01); *C08K 3/30* (2013.01); *C08K 5/14* (2013.01); *C08K 5/175* (2013.01); *C08K 2003/3054* (2013.01)

(58) Field of Classification Search
USPC .................................................. 524/544, 27
See application file for complete search history.

(56) References Cited

U.S. PATENT DOCUMENTS

| | | | |
|---|---|---|---|
| 5,188,679 A | 2/1993 | Kretchmer | |
| 5,380,891 A | 1/1995 | Connor | |
| 2016/0122572 A1* | 5/2016 | Zipplies | ..................... C08F 6/16 524/58 |
| 2016/0130409 A1* | 5/2016 | Zipplies | ..................... C08J 3/03 428/422 |

FOREIGN PATENT DOCUMENTS

| | | |
|---|---|---|
| EP | 2284200 | 2/2011 |
| EP | 2284200 A1 * | 2/2011 |
| EP | 2601126 | 6/2013 |
| WO | WO 2011-014715 | 2/2011 |
| WO | WO 2012-018603 | 2/2012 |
| WO | WO 2012-036838 | 3/2012 |

OTHER PUBLICATIONS

Geetha, "Alkyl Poly Glucosides (APGs) Surfactants and Their Properties: A Review", Tenside surfactants detergents, 2012, vol. 49, No. 5, pp. 417-427.
Hill, "Sugar-based surfactants for consumer products and technical applications", Lipid Science and technology, Jan. 1999, vol. 101, No. 1, pp. 25-33.
International Search report for PCT International Application No. PCT/US2014/062878 dated Dec. 11, 2014, 3 pages.

* cited by examiner

*Primary Examiner* — Mark Kaucher
*Assistant Examiner* — Henry Hu
(74) *Attorney, Agent, or Firm* — Thomas M. Spielbauer

(57) ABSTRACT

Described are methods of making a curable fluoropolymer having repeating units derived from vinylidenfluoride (VDF) and at least one perfluorinated monomer selected from hexafluoropropene (HFP), tetrafluoroethene (TFE), a perfluorovinyl ether (PAVE), a perfluoroallylether (PAAVE) or a combination thereof. The method includes polymerizing the monomers in an aqueous medium in a radical reaction containing one or more reaction initiators, one or more chain transfer agent containing one or more halogens selected from iodine, bromine or a combination thereof and one or more non-fluorinated aliphatic polyhydroxy emulsifiers. The polymerization is carried out without adding a fluorinated emulsifier. Also provided are curable fluoropolymers obtainable by such methods and cured fluoropolymers obtainable by curing the curable fluoropolymers, and their applications.

13 Claims, No Drawings

PEROXIDE CURABLE FLUOROPOLYMERS OBTAINABLE BY POLYMERIZATION USING NON-FLUORINATED POLYHYDROXY EMULSIFIERS

CROSS REFERENCE TO RELATED APPLICATIONS

This application is a national stage filing under 35 U.S.C. 371 of PCT/US2014/062878, filed Oct. 29, 2014, which claims the benefit of European Application No. 13190890.7, filed Oct. 30, 2013, the disclosure of which is incorporated by reference in their entirety herein.

FIELD

The present disclosure relates to methods of making curable fluoropolymers, to fluoropolymers obtained by such methods and their applications.

BRIEF DESCRIPTION

Fluoroelastomers are heat stable and resistant to a wide range of chemical reagents and are widely used for sealing materials, such as O-rings and gaskets. They are also used to make hoses and tubings or as barrier materials for the interior of hoses and tubes. Typically fluoroelastomers are used in applications where resistance to fuels or lubricants is needed such as components of combustion engines, fuel management systems, and oil and gas storage and transportation devices, oil and gas compression or decompression devices and components of sealants, barriers or valves of chemical processing equipment.

Fluoroelastomers are typically obtained by curing (cross-linking) a curable fluoropolymer. To achieve sufficient cross-linking the curable fluoropolymers contain cure sites, which are reactive groups that can undergo cross-linking reactions in the presence of suitable cross-linking agents. A commercially widely used cure system is based on a peroxide cure reaction using appropriate curing compounds having or creating peroxides, which in turn are believed to generate free radicals. The fluoropolymers suitable for use in peroxide curing systems (peroxide curable fluoroelastomers) contain reactive sites which include bromine and/or iodine atoms. It is generally believed that the bromine or iodine atoms are abstracted in the free radical peroxide cure reaction, thereby causing the fluoropolymer molecules to cross-link and to form a three dimensional network.

Peroxide curable fluoropolymers of high quality are most conveniently prepared by aqueous emulsion polymerization using fluorinated emulsifiers. The fluorinated emulsifier of choice has been a perfluorinated carboxylic acid, typically perfluorooctanoic acid. The presence of the fluorinated emulsifiers allows for the preparation of polymers in high yields (high polymer content or solid content) in short run times.

However, most fluoropolymer manufacturers have agreed to phase out the use of perfluorinated emulsifiers like perfluoro octanoic acid. Therefore alternative methods are required that produce fluoroelastomers of high quality in an economical way, for example by using partially fluorinated emulsifiers.

In European patent application EP 260 112 26 A1 a peroxide curable fluoroelastomer is described that can be obtained by a polymerization without using any fluorinated surfactants.

However, there is a need to provide methods to make fluoroelastomers without using fluorinated emulsifiers that still give a high degree of incorporation of iodine or bromine cure site end groups. This is so because it is desirable for peroxide curable fluoropolymers to have a high number of iodine end groups as it may increase the curing rate of the polymer and may also lead to favourable mechanical properties of the cured polymers. Terminal cure site groups are more easily accessible in a curing reaction and a high number of cure site end groups may accelerate the curing of the polymer.

SUMMARY

In one aspect there is provided a method of making a curable fluoropolymer comprising repeating units derived from vinylidenfluoride (VDF) and at least one perfluorinated monomer selected from hexafluoropropene (HFP), tetrafluoroethene (TFE), a perfluorovinyl ether (PAVE), a perfluoroallylether (PAAVE) or a combination thereof said method comprising polymerizing the monomers in an aqueous medium in a radical reaction containing one or more reaction initiators, one or more chain transfer agent containing one or more halogens selected from iodine, bromine or a combination thereof and one or more non-fluorinated aliphatic polyhydroxy emulsifier containing at least one polyhydroxy unit having at least two adjacent hydroxyl groups and at least one long chain unit containing from 4 to 40 carbon atoms and, wherein the polymerization is carried out without adding a fluorinated emulsifier.

In another aspect there is provided a composition comprising a non-fluorinated aliphatic polyhydroxy emulsifier and a curable fluoropolymer having a Mooney viscosity (ML 1+10 at 121° C.) of from about 20 to about 80; a $-CF_2CH_2I$ to $-CF_2CH_2OH$ group ratio of at least 10, preferably at least 15, and wherein the curable fluoropolymer contains from about 0.1 to about 0.6% wt of iodine based on the total weight of the polymer and wherein the curable polymer comprises repeating units derived from vinylidenfluoride (VDF) and at least one perfluorinated monomer selected from hexafluoropropene (HFP), tetrafluoroethene (TFE), a perfluorovinyl ether (PAVE), a perfluoroallylether (PAAVE) or a combination thereof and wherein the non-fluorinated aliphatic polyhydroxy emulsifier contains at least one polyhydroxy unit having at least two adjacent hydroxyl groups and at least one long chain unit containing from 4 to 40 carbon atoms and wherein the composition comprises no fluorinated emulsifier.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "containing", "comprising," or "having" is meant to encompass the items listed thereafter and equivalents thereof as well as additional items. The use of "consisting" is meant to be limiting and to encompass the items listed thereafter and equivalents thereof but no additional items.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

As used herein above and below the term 'copolymer' means a polymer comprising repeating units derived from the recited monomers (comonomers) without excluding the option of other repeating units being present that derive from other monomers (comonomers) not explicitly recited. The term "bipolymer" is used to indicate the presence of only two comonomers. Other comonomers may only be present if specifically indicated. The term "terpolymer" is used to indicate the presence of only three comonomers. Other comonomers may only be present if specifically indicated. Likewise, the term "quadpolymer" is used to indicate the presence of only four comonomers. Other comonomers may only be present if specifically indicated.

As used herein above and below the term "end group" of a polymer is used for groups that are at the terminal positions of the polymer backbone chain.

Curable and Cured Fluoropolymers

The curable and cured fluoropolymers provided herein have a partially fluorinated backbone. The fluoropolymers preferably contain at least 30% by weight of fluorine, more preferably at least 50% by weight of fluorine, most preferably at least 60% by weight of fluorine, and typically between 60 and 75% by weight of fluorine (based on the total weight of the polymer). The fluorine content may be achieved by selecting the comonomers and their amounts accordingly.

The fluoropolymers may be cured (cross-linked) or uncured (non-crosslinked) but curable. Typically, the curable and cured fluoropolymers are amorphous. Typically, they do not have a melting peak. Generally, they have a glass transition temperature (Tg) of less than 20° C., preferably less than −20° C. and more preferably less than −30° and most preferably less than −35° C., for example a Tg of between −40° C. and 20° C., or −50° C. and 20° C. or between −55° C. and −20° C.

Comonomers:

The fluoropolymers provided herein are copolymers and typically contain repeating units derived from 1,1-difluoroethene (vinylidenefluoride, VDF) and at least one perfluorinated comonomer. The at least one perfluorinated comonomer includes hexafluoropropene (HFP), tetrafluoroethene (TFE), at least one perfluorinated alkyl vinyl ether (PAVE), at least one perfluorinated alkyl allyl ether (PAAE) and combinations thereof. The perfluorinated vinyl and allyl ethers typically have a general structure according to the formula:

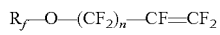

wherein n is 1 (allyl ether) or 0 (vinyl ether) and Rf represents a perfluoroalkyl residue which may or may not be interrupted by one or more than one oxygen atoms. Examples of such ethers include but are not limited to perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_3-(CF_2)_2-O-CF(CF_3)-CF_2-O-CF(CF_3)-CF_2-O-CF=CF_2$ and their allyl ether homologues.

The monomers are used in amounts to generate a curable fluoropolymer as described above, for example, a polymer having a glass transition temperature (Tg) of less than 20° C.

In one embodiment the fluoropolymers contain from about 14 to 80% by weight of VDF units.

In one embodiment the fluoropolymers contain repeating units derived from VDF and HFP. Such polymers may contain from about 14 to about 80% by weight of VDF and 18 to 66% by weight of HFP and from 0 to 68%, for example from about 5 to about 45% by weight, or from about 19 to 55% by weight, of one or more further perfluorinated monomers selected from the perfluorinated allyl or vinyl ethers as described above. The weight percentages are based on the total weight of the polymer and the amounts are selected to give a total of 100% by weight. In a particular embodiment the fluoropolymers are bipolymers of VDF and HFP but, optionally, may additionally contain cure site monomers and/or modifiers as described below.

In another embodiment the polymers contain repeating units derived from VDF, TFE, HFP and optionally one or more further perfluorinated comonomer, for example the perfluorinated allyl and vinyl ethers as described above. Typical examples of such embodiments include polymers containing up to about 60% by weight of TFE, from about 10 to about 80% by weight of VDF and from about 10 to about 66% by weight of HFP and from about 19 to about 68% by weight, for example about 5 to about 45% by weight of one or more further perfluorinated comonomers including the perfluorinated allyl and vinyl ethers described above. The weight percentages are based on the total weight of the polymer and the amounts are selected to give a total of 100% by weight. In a particular example of this embodiment the fluoropolymer is a terpolymer of VDF, TFE and HFP but, optionally, may additionally contain cure site monomers and/or modifiers as described below.

In another embodiment the fluoropolymers comprised repeating units derived from VDF, TFE and one or more further perfluorinated comonomers. Examples of further perfluorinated comonomers include but are not limited to the perfluorinated allyl or vinyl ethers as described above. For example the fluoropolymers may contain from about 14 to 80% by weight of VDF, from about 18 to about 66% by weight of HFP and from about 19 to 68% by weight of a PAAE or PAVE described above and including a combination thereof. The weight percentages are based on the total weight of the polymer and the amounts are selected to give a total of 100% by weight. In a particular embodiment the fluoropolymers are terpolymers of TFE, VDF and a PAVE or a PAAE, but, optionally, may additionally contain cure site monomers and/or modifiers as described below and may, optionally contain a further PAVE or PAAE or a combination thereof. A particularly preferred PAVE is perfluoro methyl vinyl ether (PMVE).

Instead or in addition to the further perfluorinated comonomers described above, the fluoroelastomers may also contain units derived from non-fluorinated olefins ("non-fluorinated comonomers"). Examples include olefins containing from 2 to 8 carbon atoms and include but are not limited to vinyl chloride, vinylidene chloride, ethene (E) and propene (P). The amount of non-fluorinated comonomers in the fluoroelastomer, when present, is generally between greater than 0 and up to 20 weight %, preferably between 5 and 10 weight %.

Other exemplary combinations of comonomers include but are not limited to: polymers comprising or consisting of tetrafluoroethene, ethene and vinylidenefluoride; tetrafluoroethene, propene and vinylidene fluoride; and tetrafluoroethene, hexafluoropropene and ethene. Instead of non-halogenated comonomers, chlorinated fluoromonomers may be used, for example trichlorofluoroethene. The monomers are used in amounts to create a curable fluoropolymer as described above, e.g. a fluoropolymer having a Tg of less than 20° C.

Modifiers:

The fluoropolymers provided herein may further contain units derived from at least one perfluorinated bisolefinic ether. It is believed that these ethers create a polymer architecture that may favourably influence the mechanical properties and the curing behaviour of the fluoroelastomers. This may be achieved by generating branches in the polymer backbone, particularly when the bisolefinic ethers are used in small amounts. Therefore, these bisolefinic ethers are also referred to herein as "modifiers". Suitable perfluorinated bisolefinic ethers include those represented by the general formula:

$$CF_2=CF-(CF_2)_n-O-(Rf)-O-(CF_2)_m-CF=CF_2$$

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms. A particular suitable perfluorinated bisolefinic ether is a di-vinylether represented by the formula:

$$CF_2=CF-O-(CF_2)_n-O-CF=CF_2$$

wherein n is an integer between 1 and 10, preferably 2 to 6.

Further specific examples include bisolefinic ethers according the general formula $$CF_2=CF-(CF_2)_n-O-(CF_2)_p-O-(CF_2)_m-CF=CF_2$$

wherein n and m are independently either 1 or 0 and p is an integer from 1 to 10 or 2 to 6.

Further suitable perfluorinated bisolefinic ethers can be represented by the formula $$CF_2=CF-(CF_2)_p-O-(R_{af}O)_n(R_{bf}O)_m-(CF_2)_q-CF=CF_2$$

wherein $R_{af}$ and $R_{bf}$ are different linear or branched perfluoroalkylene groups of 1-10 carbon atoms, in particular 2 to 6 carbon atoms, and which may or may not be interrupted by one or more oxygen atoms. $R_{af}$ and/or $R_{bf}$ may also be perfluorinated phenyl or substituted phenyl groups; n is an integer between 1 and 10 and m is an integer between 0 and 10, preferably m is 0. p and q are independent from each other either 1 or 0. Such modifiers can be prepared by methods known in the art and are commercially available, for example, from Anles Ltd, St. Petersburg, Russia. Preferably, the modifiers are used and present in low amounts, for example in lower amounts than any of the comonomers described above. More preferably, the modifiers are present in amounts of greater than 0 and up to 1.4%, for example from about 0.1% to about 1.2 or from about 0.3% to about 0.8% by weight based on the total weight of fluoropolymer. In some embodiments the fluoropolymer do not contain any modifiers as described above.

Halogen Cure Sites

The curable fluoropolymers provided herein further comprise at least one cure site as an end group. Suitable cure sites are halogen atoms capable of participating in a peroxide cure reaction. The halogen capable of participating in a peroxide cure reaction can be bromine or iodine. Preferably the halogen is iodine. In preferred embodiments the curable fluoropolymers contain I and/or Br end groups, for example —$CF_2H_2I$ and/or —$CF_2CH_2Br$ groups and preferably —$CH_2I$ groups. In addition to —$CF_2CH_2I$ and/or —$CF_2CH_2Br$ groups the fluoropolymers may also contain —$CF_2CH_2CF_2CH_2I$ groups. Typically, the curable fluoropolymers according to the present disclosure have a ratio of —$CF_2CH_2I$ to —$CF_2CH_2OH$ groups of at least 10, preferably 15, more preferably at least 18, or, for example, from 20 to 50, or from 25 to 40.

Cure site end groups as described above can be introduced by using a chain transfer agent in the polymerization that contains at least one I or Br atom. It is understood that I-containing chain transfer agents will introduce an I cure site end group into the polymer and a Br-containing chain transfer agent will introduce a Br cure site end group. Such I and/or Br containing chain transfer agents will be described in greater detail below. Alternatively or in addition halogenated redox systems as described below may be used to introduce iodine and/or bromine end groups.

However, further I or Br cure sites may also be present in the curable fluoropolymers. In addition to the cure sites at the terminal position (i.e. I or Br end groups) I or Br cure sites can also be distributed along the polymer chain. This may also be achieved by using the I or Br containing chain transfer agents as described herein. Alternatively, cure sites within the polymer backbone can be introduced by using a suitable cure-site monomer, although this may not be required. In fact in one embodiment the curable fluoropolymers do not contain any cure site monomers. Cure site monomers are monomers containing one or more functional groups that can act as cure sites. Cure-site comonomers include for instance:

(a) bromo- or iodo-(per)fluoroalkyl-(per)fluorovinylethers, for example including those having the formula:

$$ZRf-O-CX=CX_2$$

wherein each X may be the same or different and represents H or F, Z is Br or I, Rf is a C1-C12 (per)fluoroalkylene, optionally containing chlorine and/or ether oxygen atoms. Suitable examples include $ZCF_2-O-CF=CF_2$, $ZCF_2CF_2-O-CF=CF_2$, $ZCF_2CF_2CF_2-O-CF=CF_2$, $CF_3CFZCF_2-O-CF=CF_2$, wherein Z represents Br of I; and (b) bromo- or iodo perfluoroolefins such as those having the formula:

$$Z'-(Rf)r-CX=CX_2$$

wherein each X independently represents H or F, Z' is Br or I, Rf is a $C_1$-$C_{12}$ perfluoroalkylene, optionally containing chlorine atoms and r is 0 or 1.

Examples include: bromo- or iodo-trifluoroethene, 4-bromo-perfluorobutene-1,4-iodo-perfluorobutene-1, or bromo- or iodo-fluoroolefins such as 1-iodo,2,2-difluoroethene, 1-bromo-2,2-difluoroethene, 4-iodo-3,3,4,4,-tetrafluorobutene-1 and 4-bromo-3,3,4,4-tetrafluorobutene-1; 6-iodo-3,3,4,4,5,5,6,6-octafluorohexene-1.

(c) non-fluorinated bromo and iodo-olefins such as vinyl bromide, vinyl iodide, 4-bromo-1-butene and 4-iodo-1-butene.

From the above iodine containing compounds, Br-free compounds are preferred.

Typically, the amount of iodine, bromine or the combination thereof contained in the fluoropolymer is between 0.001 and 5%, preferably between 0.01 and 2.5%, or 0.1 to 1% or 0.2 to 0.6% by weight with respect to the total weight of the fluoropolymer. In one embodiment the curable fluoropolymers contain between 0.001 and 5%, preferably between 0.01 and 2.5%, or 0.1 to 1%, more preferably between 0.2 to 0.6% by weight of iodine based on the total weight of the fluoropolymer. In one embodiment of the present disclosure the curable fluoropolymers contain iodine-containing cure site monomers and iodine end groups.

In addition to the I and/or Br cure sites described above, the curable fluoropolymers may, optionally, further contain nitrile-containing cure sites. The presence of nitrile-containing cure sites may not be necessary and in some embodiments the curable fluoropolymers do not contain any nitrile-group containing cure sites.

Nitrile-containing cure sites may be reactive to other cure systems for example, but not limited to, bisphenol curing systems or triazine curing systems. Examples of such additional cure sites include nitriles, for example nitriles introduced into the polymer from nitrile containing monomers. Examples of nitrile containing monomers that may be used correspond to the following formulae: $CF_2=CF-CF_2-O-Rf-CN$; $CF_2=CFO(CF_2)_rCN$; $CF_2=CFO[CF_2CF(CF_3)O]_p(CF_2)_vOCF(CF_3)CN$; $CF_2=CF[OCF_2CF(CF_3)]_kO(CF_2)_uCN$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene), $CF_2=CFO(CF_2)_5CN$, and $CF_2=CFO(CF_2)_3OCF(CF_3)CN$.

The curable fluoropolymers according to the present disclosure are peroxide-curable. They can be cured by a peroxide cure system to give cured fluoropolymers having good mechanical properties. In some embodiments the cured fluoropolymers have at least one or all of the following properties:

(i) an elongation at break of at least 100%, preferably at least 150% or even at least 200%;

(ii) a tensile strength of at least 12 or at least 15 MPa, preferably at least 18 MPa;

(iii) a Shore A hardness of at least 30, preferably at least 40.

Typical embodiments have a tensile strength of at least 12 or at least 15 MPa, a Shore A hardness of at least 40 and an elongation at break of at least 160%. In particular embodiments of the present disclosure the curable fluoropolymers typically have Mooney viscosities (ML 1+10 at 121° C.) of 1 to 150, preferably 2 to 100, more preferably 10 to 60. The Mooney viscosity can be determined, for example, according to ASTM D-1646.

The fluoroelastomers may have a monomodal or bi-modal or multi-modal weight distribution. The fluoroelastomers may or may not have a core-shell structure.

Methods of Making Curable Fluoropolymers

The fluorinated polymers for use in connection with the present disclosure can be made in accordance with any of the known polymerization methods for making fluoropolymers. Typical polymerizations are radical polymerizations involving a radical initiator. The polymerization methods include without limitation, emulsion polymerization, suspension polymerization and solvent polymerization. However, it is a particular advantage of the polymers provided herein that they are accessible by aqueous emulsion polymerization, which is a preferred polymerization method. A further advantage of the methods provided herein is that they do not require the addition of fluorinated emulsifiers. They also do not require the presence of any inert fluorinated additives, such as for example saturated fluorinated polyoxyalkylenes or fluorinated hydrocarbons. Therefore, the polymerization may be carried out in the absence of such additives. Typically, the curable fluoropolymers are prepared by a polymerization process in an aqueous phase, preferably by an aqueous emulsion polymerization in the presence of a non-fluorinated polyhydroxy emulsifier as described below. The aqueous polymerization involves reacting the comonomers—including cure site monomers and modifiers if their presence is desired—in an aqueous medium containing one or more reaction initiators and one or more non-fluorinated emulsifiers as described below. The polymerization may be carried out in the presence of one or more chain transfer agents containing the iodine or bromine atom to be introduced into the polymer as cure sites and/or the redox system described below.

Also present may be, for example, auxiliaries like buffers, antioxidants, further monomers and other cure-site monomers and other non-halogenated chain transfer agents such as but not limited to ether, alcohols and esters.

For making the curable fluoropolymers of the present disclosure the polymerization can be carried out without adding any fluorinated emulsifiers, which are typically added to stabilize the polymers in the aqueous phase or to allow the polymerization to proceed at the desired speed. For making the curable fluoropolymers of the present disclosure the polymerization can also be carried out without adding any inert fluorinated compounds such as fluorinated or perfluorinated polyoxy alkylenes, which may be used (in particular in combination with emulsifiers) to prepare emulsions, called in the art microemulsions. Microemulsions are used in the art as reaction medium for initiating the polymerization.

Initiators

As reaction initiators standard initiators for the polymerization of fluoropolymers may be used, in particular standard initiators for aqueous emulsion polymerizations. Typically the initiators are compounds that decompose to produce free radicals under the reaction conditions. Examples include but are not limited to peroxo compounds. Specific examples include, but are not limited to, ammonium permanganate, potassium permanganate, potassium or ammonium sulfinate, ammonium peroxodisulfate, potassium peroxodisulfate or combinations thereof. To avoid generation of metal content which may be detrimental in some application, ammonium salts may be used instead of alkali salts. Generally, the initiators may be used in a range of from about 0.001-about 0.01 weight % based on the total amount of comonomers. Redox initiators are preferably used in combination with catalysts (e.g. heavy metal ions, for example copper ions and/or iron ions). Redox initiator systems may also be used, including but not limited to a combination of a peroxodisulfate salt and a bisulfite salt.

Non-Fluorinated Polyhydroxy Emulsifiers

The polyhydroxy surfactants provided herein have a polyhydroxy unit, providing a polar entity, linked to a non polar long-chain unit via a linking group. The linking group can be a chemical unit or a chemical bond. The polyhydroxy unit may be acyclic or cyclic. The emulsifier may comprise a plurality of cyclic or acyclic polyhydroxy units. The polyhydroxy unit has at least two hydroxyl groups (—OH groups). Preferably, the polyhydroxy unit contains at least two adjacent hydroxyl groups, directly linked to the cyclic ring or acyclic chain as the case may be. The emulsifiers are typically non fluorinated. Generally, they are non-aromatic. Preferably, they are non-ionic. In a preferred embodiment they are non-fluorinated, non-aromatic, saturated and non-ionic.

The long chain unit may contain from 4 to 40 carbon atoms. Typically, it is based on a hydrocarbon chain. It typically contains or consist of hydrocarbon or a (poly)oxy hydrocarbon chain, i.e. a hydrocarbon chain that is interrupted once or more than once by an oxygen atom. Typically the long chain unit is an alkyl chain or a (poly)oxy alkyl chain, i.e. an alkyl chain that is interrupted once or more than once by an oxygen atom to provide a catenary ether function. The long chain unit may be linear, branched or cyclic but preferably is acyclic.

Emulsifiers with Acyclic Polyhydroxy Units:

In one typical embodiment of the present disclosure the polyhydroxy emulsifiers according to the present disclosure contain at least one polyhydroxy unit that is acyclic. Examples of such embodiments include compounds represented by the general formula (I):

R1-Li—R2  (I)

wherein R1 represents the long chain unit, Li the linking group and R2 the acyclic polyhydroxy unit.

R1 is a linear or branched aliphatic residue containing from 4 to 26 carbon atoms, wherein the carbon chain of the aliphatic residue may optionally be interrupted by one or more catenary oxygen (ether) atoms; R1 is preferably acyclic. R1 may be an alkyl or alkenyl group wherein the carbon chain may, optionally, be interrupted by one or more than one catenary oxygen atoms to form an ether or polyether residue. Optionally, the alkyl or alkenyl group may also and in addition be substituted by alkoxy or polyoxy alkyl groups.

Li is selected from linking group containing one or more nitrogen atoms, (for example a linking groups containing an amino group, an amido group, a sulfoamido group, or a phosphoamido groups), phosphate ester groups, phosphonate ester groups, sulfate ester groups, sulfonate ester groups, or carboxylate ester groups. Preferably, Li represents a linking group containing one or more nitrogen atoms.

R2 represents an acyclic aliphatic poly hydroxylated group having at least two, preferably adjacent, hydroxyl groups (—OH groups) directly bonded to the carbon chain of the aliphatic residue. Preferably, the poly hydroxylated group R2 contains from 4 to 36 carbon atoms. In addition to the hydroxyl groups, the poly hydroxylated group R2 may also contain other substituents, for example alkoxy or polyoxy alkyl substituents but preferably the group R2 does not contain substituents other than the hydroxyl groups. R2 may be linear or branched. R2 preferably contains a unit of the formula —(CHOH)n- wherein n is an integer from 2 up to and including 8.

In some examples according to the acyclic embodiment the polyhydroxy emulsifiers are nitrogen-containing surfactants and can be represented by formula (II):

R1-Li—R2'-CH$_2$OH  (II)

wherein R1 is defined as above with regard to formula (I), R2' is an acyclic polyhydroxylated aliphatic group. R2' may be acyclic and is linear or branched and may contain from 3 to 20 carbon atoms and has at least two, preferably adjacent, hydroxyl groups directly bonded to the carbon chain, wherein the chain may further may be interrupted by one or more than one catenary oxygen atoms to introduce ether or polyether functionalities. Preferably, R2' contains a unit —(CHOH)$_n$— wherein n is an integer from 2 up to and including 8.

Li represents a linking group comprising one or more nitrogen atoms. Preferably Li represents an amino (—N (R)—) group, or an amido (—(C=O)N(R)—) group wherein R represents hydrogen or a (linear or branched) alkyl residue, wherein the alkyl residue may optionally be substituted by one or more catenary oxygen atoms (ether atoms).

Acyclic polyhydroxy emulsifiers as described above may be conveniently obtained, for example, by reacting a glycoamine (providing the polyhydroxy unit) with functionalized alkyls or alkenyls (providing the long chain unit) as described, for example, in U.S. Pat. No. 5,380,891 to Connors et al, incorporated herein by reference. Glycoamines can be obtained by a reductive amination of a reducing sugar yielding an amino-functionalized ring-opened sugar, the glycoamine. For example a glucose (fig. 1.) can be converted in this way into the respective glycoamine (or glucamine, fig. 2.)

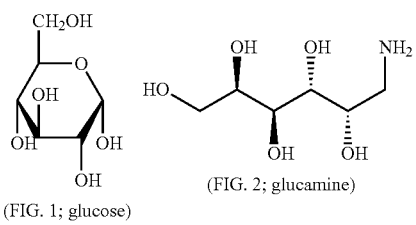

(FIG. 1; glucose)    (FIG. 2; glucamine)

The glycoamines are reacted with alkyls (or alkenyls) functionalized to react with the amine group of the glycamines to form a nitrogen-containing linking group linking the alkyl (or alkenyl) chain to the sugar-derived polyhydroxy chain. Typical functional groups of the functionalized alkyls (or alkenyls) include but are not limited to acid groups, ester groups including anhydride groups and acide halide groups. Examples of suitable functionalized alkyls (or alkenyls) include but are not limited to fatty acids or fatty acid esters. Accordingly, residue R1 in formulae (I) and (II) may correspond to the hydrocarbon part R' of a fatty acid R'COOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosahexaenoic acid. R1 may also correspond to the residue of a functionalized aliphatic residue R"X wherein X is a functional group to react with the glycoamine to form the linking group and R" may represent an alkyl or alkenyl residue that contains one or more catenary oxygen atoms, like for example a (poly) ethoxylate or (poly) propoxylate residue or a combination thereof.

In the reductive amination of a sugar the sugar is typically reacted, with ammonia or an alkylamine or alkyloxy or polyoxy alkyl amine (RNH$_2$, wherein R represents H or the alkyl, alkyloxy or polyoxy alkyl group) under reducing conditions, e.g. in the presence of hydrogen and optionally in the presence of catalysts as is known in the art, like for example Ranney nickel. Typical examples are described in U.S. Pat. No. 5,380,891, incorporated herein by reference. Preferred sugars that may be used in the above described reaction to prepare glycoamines include but are not limited to glucose, fructose, maltose, lactose, galactose, mannose, and xylose, as well as glyceraldehyde. In some embodiments high dextrose corn syrup, high fructose corn syrup, high maltose corn syrup may also be used as raw materials but yield a mixture of glycoamines.

In a preferred embodiment of the present disclosure the polyhydroxy surfactants are amido polyhydroxides. They can be represented by the general formula (III):

$$R'-C(=O)-N(R^3)-Z \quad (III)$$

wherein $R^3$ is H or a linear or branched aliphatic residue containing from 1 to 8 carbon atoms, preferably $R^3$ is H or a $C_1$-$C_4$ hydrocarbyl or hydroxyhydrocarbyl, wherein the carbon chain of the aliphatic residue may optionally be interrupted by one or more than one catenary oxygen (ether) atoms. $R^3$ may be linear or branched. Examples of suitable hydroxyhydrocarbyl groups include but are not limited to 2-hydroxyethyl, 2-hydroxypropyl, 2 hydroxybutyl, 3-hydroxy propyl, 3-hydroxy butyl, 4-hydroxy butyl. In preferred embodiments $R^3$ represents an alkyl group, more preferably an alkyl group selected from methyl, ethyl, butyl and isobutyl.

$R^1$ in formula (III) is as defined as R1 of formula (I). Generally $R^1$ represents a linear or branched aliphatic residue containing from 5 to 31 carbon atoms, preferably a $C_5$-$C_{31}$ hydrocarbyl moiety. In some embodiments, $R^1$ represents a straight chain $C_6$ to $C_{20}$ alkyl or alkenyl residue, preferably a $C_7$-$C_{19}$ alkyl or alkenyl moiety, preferably a straight chain $C_9$-$C_{17}$ alkyl or alkenyl moiety, and more preferably a straight chain $C_{11}$-$C_{19}$ alkyl or alkenyl moiety. Typically, $R^1$ may be the hydrocarbon part R of a fatty acid RCOOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosahexanenoic acid. $R^1$ may also represent an alkyl residue as described above that contains one or more catenary oxygen atoms, like for example an ethoxylate or propoxylate residue or a combination thereof.

In formula (III) Z represents a poly hydroxyl hydrocarbyl moiety having at least 2 or at least 3 hydroxy groups directly bonded to the carbon chain. Z is acyclic and may be linear but may also be branched. Z may also contain, in addition to the hydroxyl groups, alkoxy or polyoxyalkyl groups but preferably only contains hydroxyl groups. Z may be derived from a glycamine, e.g. a reducing sugar subjected to a reductive amination reaction to yield a ring-opened amino functionalized sugar. Examples for reducing sugars include but are not limited to glucose, fructose, maltose, lactose, galactose, mannose, xylose and glyceraldehydes, including combinations thereof. In some embodiments high dextrose corn syrup, high fructose corn syrup, high maltose corn syrup may also be used as raw materials which will yield a mixture of glycoamines.

In preferred embodiments Z contains an acyclic unit represented by the general formula $-(CHOH)_n-$ more preferably $-(CHOH)_n-CH_2OH$ wherein n represents an integer of from 2 up to and including 8. Particular examples include embodiments wherein Z is selected from the acyclic groups consisting of $$-CH_2-(CHOH)_n-CH_2OH;$$

$$-CH(CH_2OH)-(CHOH)_{n-1}-CH_2OH; \text{ and}$$

$$-CH_2-(CHOH)_2-(CHOR")_m-(CHOH)_o-CH_2OH;$$

where n is an integer from 1 up to and including 8 preferably up to and including 5; m and o are integers and including 0 wherein the sum of m and o equals n−2 and R" represents substituents selected from identical of different alkoxy, polyoxylalkyl and (poly)hydroxyalkoxy or (poly)hydroxypolyoxyalkyl residues. Specific examples include but are not limited to 1-deoxyglucityl, 2-deoxyglucityl, 2-deoxyfructityl, 1-deoxymaltityl, 1-deoxylactityl, 1-deoxygalactityl, 1-deoxymannityl, 1-deoxymaltotriotityl, 2,3-dihydroxypropyl (from glyceraldehyde), etc. In a preferred embodiment Z is a glycityl, more preferably Z is $$-CH_2-(CHOH)_4-CH_2-OH.$$

In some embodiments the polyhydroxides are the reaction product of the reaction of N-alkyl glucamines (e.g. N-methylamine) and fatty acids or fatty acid alkyl esters—as for example described in U.S. Pat. No. 5,380,891.

According to another embodiment of the present disclosure the polyhydroxy surfactants are present as a blend of several polyhydroxy surfactants.

Polyhydroxy Emulsifiers with Cyclic Polyhydroxy Units:

In another embodiment of the present disclosure the polyhydroxy emulsifier contains at least one cyclic polyhydroxy unit. Such emulsifiers may be sugar-based. The sugar-based emulsifiers are typically based on sugars that have been modified to contain at least one long chain unit. The long chain unit of the cyclic emulsifiers may be acyclic and may be linear or branched. In a typical embodiment the long chain unit contains from 4 to 26 carbon atoms, for example from 8 to 22 or from 10 to 16 carbon atoms. The chain may be interrupted once or more than once by catenary heteroatoms, including O (oxygen) and N (nitrogen) atoms, but preferably catenary oxygen atoms, to form an ether or polyether residue. The long chain unit typically comprises an alkyl chain, which may, optionally, contain one or more catenary heteroatoms, preferably oxygen atoms and may, optionally, contain substituents including alkoxy or polyoxyalkyl substitutents. The long chain unit may be attached to the polyol unit directly of via a linking group. Examples of linking groups include but are not limited to ether, ester, or amide groups and combinations thereof.

In a typical embodiment the cyclic polyol unit to which the long chain unit is attached contains at least one six-membered ring of 5 carbon atoms and one hetero atom as described above, preferably, an oxygen atom. In another typical embodiment the cyclic polyol unit to which the long chain unit is attached contains at least one five-membered ring of 4 carbon atoms and one hetero atom as described above, preferably, an oxygen atom. In a preferred embodiment the polyol unit further contains at least two or at least three adjacent hydroxy groups (—OH groups) bound to the carbon ring atoms. The cyclic polyol unit is most conveniently a sugar and the emulsifiers are sugar-based emulsifiers. The sugar-based emulsifiers may contain a single cyclic polyol (sugar) unit or multiple cyclic polyol (sugar) units. The sugar-based emulsifier according to this embodiment of the present disclosure is typically a sugar that has been modified to contain the long chain unit and the sugar forms the polyol unit of the sugar-based emulsifier. In some embodiments the sugars have been modified in that one or more of the hydrogen atoms of a hydroxy group bound to the carbon ring atom of the sugar has been substituted by the long chain residue such that an ether, ester or amide bond is created between the long chain residue and the sugar moiety.

The sugar-based emulsifiers may comprise more than one cyclic polyol unit, which units may be identical or different. The polyol typically comprises a six-membered ring, typically a pyranose ring (a six-membered ring of five carbon atoms and one oxygen atom). Suitable sugar based emulsifiers include but are not limited to alkyl glycosides (which include monoglycosides and polyglycosides). Glycosides are sugar molecules that are modified to contain a non sugar unit. For example alkyl glycosides are sugars modified to contain an alkyl unit. Examples for the sugar parts of the glycosides include, but are not limited to monosaccharides and polysaccharides. Monosaccharides include pentoses and hexoses. Typical examples of monosaccharides include ribose, glucose, galactose, mannose, fructose, arabinose, xylose. Polyglycosides include oligomers containing from 2 to 10, preferably 2 to 4 sugar units of the same or different monosaccharides and include oligosaccharides including but not limited to saccharose, maltose, lactose, raffinose and isomaltose.

Specific examples of sugar-based emulsifiers include but are not limited to alkyl glucosides. Alkyl glucosides include monoglucosides (i.e. a molecule with a single glucose moiety modified to contain an alkyl group) diglucosides (i.e. a molecule with two glucose moieties) and poly glucosides (i.e. molecules with two or more glucose moieties and typically up to 4 or even up to 10 glucose units).

The glycosides may contain only glucose units (in which case the glycosides are referred to as glucosides) but may also contain units of other sugars. The sugar moiety may be present as a pyranose or as combinations of pyranoses or combinations of pyranoses and furanoses. The sugar moiety may also be present as furanose or a combination of furanose only (furanoses are five membered rings of four carbon ring atoms and one oxygen ring atom) and mixtures thereof (for example, but not limited to glucopyranosides, glucofuranosides, di-glucopyranosides, di-furanosides, glucopyranoside-glucofuranosides and the like). Preferably, the glycosides are alkyl glucosides. The alkyl glucosides may contain a single, multiple, identical and different alkyl residues as long chain units as described above. The alkyl residues include linear or branched, acyclic residues containing at least 6 carbons, preferably at least 8 carbon atoms. In a typical embodiment the alkyl chain contains from 6 to 26, or from 8 to 16 carbon atoms. The alkyl chains may be substituted, wherein the substituents include, for example, halogens (other than fluorides) or catenary (ether) oxygen atoms, e.g. the long chain moiety may be a (poly)oxy alkyl. The alkyl chains are preferably not substituted. The glucosides may be mono, di- or polyglucosides, i.e., the may contain one, two or at least two glucose units, preferably from 1 to 4 glucose units.)

Fig. 3 represents a typical example of a (poly)glycoside, wherein m represents an integer of 1 and up to 10, preferably m represents 1, 2, 3 or 4 and R represents the long chain unit as described above. For example, R may represent a linear or branched alkyl, oxyalkyl, polyoxyalkyl chain as described above. The sugar unit represented in figure 3 is a glucose and the compound can also be referred to as a glucoside. In case R represents an alkyl group the compound represented in figure 3 would be an alkyl(poly)glucoside. As described above, instead of a glucose also other sugars or combinations of other sugars with glucose may be used.

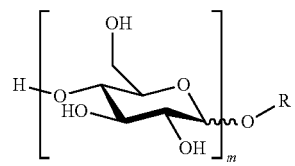

FIG. 3; an example of a (poly)glycoside.

According to a specific embodiment of the present disclosure the sugar-based emulsifiers may be present as a blend of sugar-based emulsifiers. The blend may contain sugar-based emulsifiers of different chain lengths, i.e. the sugar-based emulsifiers are at least bimodal compositions having populations of different chain length. For example, the first population may contain chains having from 6 to 10 carbon atoms and the second population contains chains from 10 to 18 carbon atoms. Such multimodal composition can be prepared by blending the appropriate sugar-based emulsifiers. Examples of blends include blends containing from about 20 to 50% by weight of a population a), which is the population containing sugar-based emulsifiers with chain length from 6 to 10 carbon atoms and from 20 to 50% by weight of a population b), which is the population containing sugar-based emulsifiers with chain length from 10 to 18 carbon atoms.

Sugar-based emulsifiers are commercially available. The synthesis of sugar-based emulsifiers is described for example, in D. Geetha and R. Tyagi, Tenside Surf. Det. 49 (2012) 5, pages 417 to 427.

The non-fluorinated polyhydroxy emulsifiers described above may be added to the reaction mixture prior to the polymerization. Typical amounts include from about 0.0001-2 weight % based on the total amount of polymer to be produced. In some embodiments the non-fluorinated polyhydroxy emulsifiers may be used in an amount of from about 0.01 to about 0.1 weight % based on the amount of polymer to be produced. In other embodiments the amounts of the non-fluorinated polyhydroxy emulsifier is from about 0.0001 to about 0.001 weight percent based on the amount of polymer to be produced. It is an advantage of the present disclosure that such low amounts of the non-fluorinated polyhydroxy emulsifiers achieve a good incorporation of iodine into the polymer and a favourable —$CH_2I$ to —$CH_2OH$ ratio, for example a ratio of at least 15 or at least 18. Larger amounts of the non-fluorinated emulsifier may slow down the incorporation rate of iodine or to chain termination resulting in fluoropolymers of low molecular weight.

The non-fluorinated polyhydroxy emulsifiers described herein can also be added intermittently or continuously over the course of the polymerization, preferably after a part of the total amount of the non-fluorinated polyhydroxy emulsifiers had been precharged. Desirably, the total amount of the non-fluorinated polyhydroxy emulsifiers should not exceed 2 weight %. In some embodiments the amount of the non-fluorinated polyhydroxy emulsifiers described herein does not exceed 0.2 weight % based on the amount of polymer to be produced. The amount of polymer to be produced is the sum of all monomers fed into the polymerization.

I- and/or Br-Containing Chain Transfer Agents

Preferably, the polymerization according to the present disclosure is carried out in the presence of at least one chain transfer agent (CTA) containing iodine and/or bromine atoms. Chain transfer agents are compounds capable of reacting with the propagating polymer chain and terminating the chain propagation. Examples of suitable chain transfer agents include those having the formula $RP_x$, wherein P is Br or I, preferably I, R is an x-valent alkyl or alkylene radical having from 1 to 12 carbon atoms, which, optionally may also contain chlorine atoms but preferably contains fluorine atoms. Preferably R is Rf and Rf is an x-valent (per) fluoroalkyl or (per)fluoroalkylene radical. Preferably R (and also Rf) has from 1 to 12 carbon atoms, preferably from 1 to 6 carbon atoms. Typically, x is 1 or 2. Specific examples include $CF_2Br_2$, $Br(CF_2)_2Br$, $Br(CF_2)_4Br$, $CF_2ClBr$, $CF_3CFBrCF_2Br$. Still further examples of cure-site end groups introducing chain transfer agents include alpha-omega diiodo alkanes, alpha-omega diiodo fluoroalkanes, alpha-omega diiodoperfluoroalkanes and their iodobromo homologues or bromo equivalents. Alpha-omega denotes that the iodine or bromine atoms are at the terminal positions of the molecules. Such compounds may be represented by the general formula X—R—Y with X and Y being independently from each other I or Br, preferably X and Y being both I. R represents an alkylene unit, preferably a linear alkylene unit, e.g. —$(CH_2)_n$—, or a perfluoroalkylene unit, preferably a linear unit, e.g., —$(CF_2)_n$— with n being an integer of from and including 1 to 12. Specific examples include di-iodomethane, alpha-omega di-bromomethane, alpha-omega diiodobutane, alpha-omega diiodopropane, alpha-omega diiodopentane and alpha-omega diiodohexane, 1,2-diiodoperfluoroethane.

Typically, the I- or Br-CTA's described above may be used in amounts of from about 0.001 to 5 weight %, preferably from about 0.1 to about 0.5% by weight based on the total amount of comonomers used in the polymerization. Preferably, the total amount of the CTA may be precharged, i.e. may be added to the polymerization system prior to the polymerization. Preferably the total amount of the CTA is charged within 0.5 h from the beginning of the polymerization (i.e. from the moment at which the initiator is activated). In one embodiment of the present disclosure the CTA is added in emulsified form. For example, an aqueous emulsion of 5 to 30 weight % of CTA can be prepared by subjecting the aqueous CTA composition in the presence of surfactants to shear forces. Such shear forces may be supplied by using homogenizers or ultra-sonic irradiation. Suitable surfactants include the non-fluorinated emulsifiers described above but also suitable other non-fluorinated emulsifiers may be used. Aqueous CTA emulsions with 5 to 30 wt % of CTA and having average particle sizes from 200-1000 nm (Z-average) can be obtained. Such emulsions may be stable for more than 12 h, for example up to 24 or 48 hours.

In addition to or as alternative to the halogenated chain transfer agents described above, I and/or Br atoms can be introduced as end groups by using a suitable halogenated redox initiator system. Examples of useful halogenated redox initiator systems include a radical initiator and halogenated (I and or Br) salts like but not limited to $X(CF_2)_n SO_2M$ with n=1 to 10 (where X is Br or I). M represents a monovalent metal, such as, e.g., Na. Still further, the initiation and/or polymerization may be conducted in the presence of a halide salt such as a metal or ammonium halide, wherein the halide is selected from I and Br including for example potassium bromide, ammonium bromide and potassium or sodium iodide to introduce the respective halide at a terminal carbon atom of the fluorinated polymer.

In a preferred embodiment of the present disclosure, the chain transfer agent is an iodine containing chain transfer agent and the end groups are iodine endgroups.

Cure Site Monomers (CSM)

The cure site monomers iodine and/or bromine containing CSMs as described above may be added intermittently during the course of polymerization in undiluted form or alternatively diluted with monomers or in emulsified form using the non-fluorinated emulsifiers described above or other emulsifiers. The CSMs can also be introduced into the kettle as an aerosol or sprayed into the kettle as fine droplets. Typical amounts of CSMs include amounts of from about 0.001 to 5 weight %, preferably from about 0.1 to about 0.5% by weight based on the total amount of comonomers used.

Comonomers and Modifiers

The comonomers described above may be used in the amounts as described above. They may be added continuously or batchwise.

The modifiers as described above, if present, may be added during the polymerization. They may be added in amounts as described above, e.g. in amounts of greater than 0 and up to 1.4%, for example from about 0.1% to about 0.8% or from about 0.3% to about 0.6% by weight based on the total weight of the comonomers.

The polymerization temperature typically is in the range of about 40° C. to about 150° C., preferably from about and including 50° C. to about and including 100° C. As is standard in the art, the reaction and work up are carried out to avoid metal contamination, for example by using purified water and desirably using ammonium cations rather than metal or alkali metal cations for ionic materials in the polymerization or work up. The polymerization may be carried out continuously or batchwise. The polymerization may be carried out to generate multimodal or monomodal polymer populations. The polymerization may be run to generate core-shell particles or not to generate core-shell particles. For generating core-shell particles typically a seed polymerization is done as a first step to generate the core. The shell is the polymerized onto the core in a separate step.

It has been found that the methods provided herein lead to an increased incorporation of iodine or bromine cure site end groups from the respective iodine and/or bromine containing chain transfer agents described herein. This can be seen from the high ratio of iodine end groups versus hydroxide end groups. For example the ratio of —$CH_2I$ groups versus —$CH_2OH$ groups in curable fluoropolymers obtained by the methods described herein may be at least 10, preferably at least 15, or at least 30. This is advantageous because it is desirable for peroxide curable fluoropolymers to have a high number of iodine end groups because it may increase the curing rate of the polymer and also lead to favourable mechanical properties of the cured polymers, like for example compression set. Terminal cure site groups are more easily accessible in a curing reaction and a high number of cure site end groups may accelerate the curing of the polymer. The use of radical initiators in the aqueous medium leads to the creation of polar end groups, like —$CH_2OH$ end groups. The I- or Br-containing chain transfer agents lead to —$CH_2I$ end groups, in particular when partially fluorinated monomers are used, like VDF. Therefore, the ratio of —$CH_2I$ to —$CH_2OH$ end groups is an indication of the incorporation of iodine into the polymer for a given polymer.

It is an advantage of the methods of the present disclosure that peroxide curable fluoropolymers with high —$CH_2I$ to —$CH_2OH$ ratios can be generated. Another advantage of the present disclosure is that peroxide curable fluoropolymers with a rather small particle size can be generated. Due to the reduced number of polar hydroxyl end groups the polymers become less stable in the aqueous medium and are more prone to coagulation in the aqueous medium when the fluoropolymers are present as large particles. Peroxide curable fluoropolymers having small particles can be obtained by using the methods of the present disclosure. For example, fluoropolymer dispersion with particle sizes (Z-average) of from about 20 to about 300 nm, or from about 50 to 250 nm can be generated by the methods described herein. Such fluoropolymer dispersions are rather stable, which allows the polymerizations to be carried out to create fluoropolymers of high molecular weight. For example in preferred embodiments of the present disclosure peroxide curable fluoropolymers having a Mooney viscosity (ML 1+10 at 121° C.) of greater than 30 or even greater than 50 can be obtained, for example Mooney viscosities of from 30 to 100 or from 50 to 90 or from 60 to 80.

Fluoroelastomer Compositions

The curable fluoropolymers obtainable by the methods described above may be used to make fluoroelastomer compositions. The resulting aqueous dispersions are typically treated to isolate the fluoroelastomer generated, for example by coagulation, which may be done mechanically by increasing shear force, by chilling out, or by salting out. The isolated fluoropolymer may then be washed several time with (distilled) water and dried. The elastomer is mixed with one or more curing agents to yield a fluoroelastomer composition. Typically, the fluoroelastomer compositions are solid compositions. Typically, they contain the curable fluoropolymers and one or more peroxide cure systems. The peroxide cure systems typically include an organic peroxide. The peroxide will cause curing of the fluorinated polymer to form a cross-linked (cured) fluoropolymer when activated. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)-butyl]carbonate. Generally, about 1 to 5 parts of peroxide per 100 parts of fluoropolymer may be used.

The curing agents may be present on carriers, for example silica containing carriers. A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; (N,N')-diallyl acrylamide; hexaallyl phosphoramide; (N,N,N,N)-tetraalkyl tetraphthalamide; (N,N,N',N-tetraallylmalonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate.

The curable fluoroelastomer composition may further contain acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluorinated polymer.

The curable fluoroelastomer compositions may contain further additives, such as stabilizers, plasticizers, lubricants, fillers, and processing aids typically utilized in fluoropolymer compounding, provided they have adequate stability for the intended service conditions. A particular example of additives includes carbon particles, like carbon black, graphite, soot.

The curable fluoroelastomer compositions may be prepared by mixing the fluorinated polymer, a peroxide cure composition and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and cured in the mold or transferred to an oven and subsequently be oven-cured. In an alternative embodiment curing can be done in an autoclave. Curing is typically achieved by heat-treating the curable fluoroelastomer composition. The heat-treatment is carried out at an effective temperature and effective time to create a cured fluoroelastomer. Optimum conditions can be tested by examining the fluoroelastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

The curable fluoropolymers provided herein may typically have an onset of cure (Ts2) of less than 1 minute at 180° C.

The method described above allows for the provision of cured fluoropolymers having good mechanical properties. The cured fluoroelastomers are the reaction product of the curable fluoropolymers described herein with a peroxide cure system. Such cross-linked polymers are obtainable by curing the curable fluoropolymers in the presence of a cure peroxide system. The resulting cured fluoroelastomers may have good mechanical properties which mean they may have one or more or all of the following properties:

(i) an elongation at break of at least 100%, preferably at least 150% or even at least 200%;

(ii) a tensile strength of at least 12 or at least 15 MPa, preferably at least 18 MPa;

(iii) a Shore A hardness of at least 30, preferably at least 40.

Typical embodiments have a tensile strength of at least 12 or at least 15 MPa, a Shore A hardness of at least 40 and an elongation at break of at least 160%.

The curable and cured fluoroelastomers may be used to prepare shaped articles. Such articles may be prepared by providing a curable fluoroelastomer composition and adding further ingredients such as filler, pigments, plasticizers, lubricants and the like to the curable composition. Typical fillers include, for example, silica containing materials or carbon particles like carbon blacks, graphite, soot and the like. Shaping the composition into a shaped article may be carried out, for example, by curing the composition in shaped molds or by shaping cured compositions by means known in the art, for example by cutting die cutting and the like.

The shaped articles include, for example, tubings, pipes, hoses, seals, stoppers, gaskets, flat seals, O-rings and the like. The articles may be used as components in combustion engines, vehicles driven by combustion engines, shaft seals or components thereof, seals or barrier materials or connectors of a chemical processing apparatus, in particular in oil and gas processing, such as storage and transportation containers, as components for compression or decompression devices or valves.

This disclosure will be further illustrated by the following examples and list of particular embodiments. These examples and embodiments are provided for illustrative purposes only and are not meant to limit the invention thereto. Unless specified otherwise, percentages by weight provided herein above and below will add up in each case to 100 weight percent in the final polymer or polymer composition as the case may be. When percentages of ingredients are given herein above and below in mole % it is understood that the sum of all ingredients will add up to 100 mole.

Examples and Test Methods

I-Content:

The iodine content was determined by elemental analysis using an ASC-240 S auto sampler from Enviroscience (Düsseldorf/Germany), an Enviroscience AQF-2100 F combustion unit (software: "NSX-2100, version 1.9.8"; Mitsubishi Chemical Analytech Co., LTD.) an Enviroscience GA-210 gas absorption unit and a Metrohm "881 compac IC pro" liquid chromatography analyzer (software: Metrohm "Magic IC Net 2.3").

—$CF_2CH_2I$ to —$CF_2CH_2OH$ Ratio:

The endgroup concentration ratio of [—$CF_2CH_2$—I]/[—$CF_2CH_2$—OH] was evaluated from the $^1H$ nuclear magnetic resonance (NMR) spectra recorded with a Bruker Avance 400 (400 MHz) instrument. The polymers were dissolved in acetone-$d_6$ at a concentration of typically 50 mg/ml, 3000 scans per measurement were usually applied. Chemical shifts δ (delta) are reported using tetramethylsilane (TMS) as reference and in physical units of parts per million (ppm). The iodine containing polymers usually show well resolved signals in the $^1H$ NMR spectrum. The signals in the chemical shift range of 4.10≥delta≥3.65 ppm are attributed to the protons of —$R_f$—$CF_2$—$CH_2$—I endgroups. Each signal for the protons of the —$R_f$—$CF_2$—$CH_2$—I groups splits into a triplet due to $^3J_{F-H}$ coupling (with 15 to 19 Hz), and their chemical shift delta is dependent on the penultimate monomer unit $R_f$. The triplet for the terminal protons in —$CF_2$—$CH_2$—$CF_2$—$CH_2$—I endgroups (VDF-VDF-I end group) is one of the most prominent signals. It is centered at about delta 3.87±0.05 ppm ($δ_{ref}$). The triplet for the two methylene protons in —$CF_2$—$CH_2$—OH endgroups, is located at a position of 0.08 ppm+/−0.01 ppm to the right of $δ_{ref}$ (i.e., at delta=$δ_{ref}$−0.08 ppm+/−0.01 ppm). The signal can further be identified by its coupling constant ($^3J_{F-H}$ about 13 Hz).

The signals of the —$R_f$—$CF_2$—$CH_2$—I groups are then integrated from an area starting at 0.20 ppm to the left of $δ_{ref}$ and up to 0.07 ppm to the right of $δ_{ref}$ (i.e. at delta=$δ_{ref}$+0.20 ppm to $δ_{ref}$−0.07 ppm. For example, if $δ_{ref}$ is at 3.90 ppm the signals of the area starting at 4.1 ppm and up to 3.83 ppm are integrated). This area ($A_{CH2I}$) represents the concentration of —$CF_2CH_2I$ endgroups.

The amount of —$CF_2CH_2OH$ end groups is determined by integrating the area of the central signal of the —$CF_2$—$CH_2$—OH triplet ($A_{CH2OH}$). The areas of the two satellite signals surrounding the centers signal of the triplet are not included in the integration because they may (partially) overlap with signals from the —$CF_2CH_2I$ end groups. Therefore the integration of the main signal of the triplet only gives a half of the area of the signals for the —$CF_2CH_2OH$ methylene protons. Therefore, the ratio of [—$CF_2CH_2$—I]/[—$CF_2CH_2$—OH] end groups is calculated as:

$$A_{CH2I}/2A_{CH2OH}.$$

Glass Transition Temperature (Tg):

The Tg can be measured by differential scanning calometry, for example using a TA Instruments Q200 modulated DSC. Conditions of measurements were: heating rate from −150° C. to 50° C. of 2-3° C./minute. The modulation amplitude was +/−1° C. per minute during 60 seconds.

Average Particle Size:

Average particle sizes of polymer particles as polymerized was determined by electronic light scattering in accordance with ISO 13321 using a Malvern Autosizer 2c. The average particle sizes are expressed as Z-average.

Solid Content:

Solid content (fluoropolymer content) was determined gravimetrically according to ISO 12086. A correction for non-volatile salts was not made.

Press-Cure and Curing Properties:

Sample sheets measuring 150×150×2 0 mm can be prepared for physical property determination by pressing at about 100 bar for 15 minutes at 180° C. Post-Cure:

Press-cured sample sheets can be exposed to heat in air for 2 h at 180° C. The samples are returned to ambient temperature before testing. Curing properties can be measured using a Monsanto Rheometer (at 180° C. in accordance with ASTM D 5289-93a), reporting minimum torque (ML), maximum torque (MH) and delta torque (which is the difference between MH and ML). Torque values are reported in inch-lbs. Also reported are tg [delta] @ML and tg [delta] @MH. Further reported are parameters indicating the curing speed such as Ts2 (the time required to increase the torque by two units over the ML); Tc50 (the time to increase torque above ML by 50% of delta torque), and Tc90 (the time to increase torque above ML by 90% of delta torque), all of which are reported in minutes.

Hardness:

Hardness of samples can be measured according to ASTM D 2240-85 Method A with a Type A2 Shore Durometer. Units are reported in points on the Shore A scale.

Tear Strength:

Trouser Tear strength can be determined according to DIN 53507. The units are reported in kN/m. Tensile Strength at Break, Elongation at Break, and Modulus at 100% Elongation can be determined using an Instron™ mechanical tester with a 1 kN load cell in accordance with DIN 53504 (S2 DIE). All tests are run at a constant cross head displacement rate of 200 mm/min.

Compression Set of Buttons:

The curable compositions are press-cured and post-cured to form buttons having a thickness of 0.24 inches (6 mm) Compression set of button specimens are measured according to ASTM 395 Method B. Results are reported as a percentage of permanent set, and are measured at 25% deflection.

Emulsion Experiments:

To screen the emulsifying properties of formulations containing an alpha-omega diiodoperfluoroalkane four samples were prepared containing: 10.0 g diiodoperfluorobutane chain transfer agent and 38.66 g distilled water. In example C1 no emulsifier was added, in example C2, 1.66 g of a partially fluorinated polyether acid (fluorinated emulsifier) was added and in example C3 1.66 g of HOSTAPUR SAS 30 (a secondary alkyl sulfonate) was added. In reference example R1 1.66 g of GLUCOPON 600 CSUP (an alkyl polyglycoside) were added. The mixtures were subjected to ultrasound treatment for 1 minute and the particle size of the mixtures was determined. In C1 no emulsion was formed. In C2 the emulsion had a particle size of 1397 nm (Z-average) and in C3 the emulsion had a particle size of 560 nm. In R1 the emulsion had a particle size of 229 nm and remained stable for more than 72 hours.

These emulsion experiments show the emulsifying power of the non-fluorinated polyhydroxy emulsifiers described herein at ambient conditions.

Example 1

An amorphous $TFE_{9.9}/PMVE_{19.8}/VDF_{70.3}$ terpolymer was prepared in a polymerization kettle with a total volume of 48.5 L equipped with an impeller agitator system according to the following procedure. The oxygen free kettle was charged with 28.0 l deionized water, 3.2 g $Na_2S_2O_5$, 5.0 g of a 50% aqueous solution of Glucopon 600 CS UP (available from Sigma Aldrich) and with 5 g 1,4-diiodoperfluorbutane. The kettle was then heated up to 80° C. and the agitation system was set to 240 rpm and charged with perfluoromethylvinylether (PMVE) to a pressure of 7.1 bar absolute, with vinylidenefluoride (VDF) to 15.1 bar absolute and with tetrafluorethylene (TFE) to 17.0 bar absolute reaction pressure. The polymerization was initiated by the addition of 400 ml of a 2.0% aqueous ammonium persulfate (APS) solution. The reaction starts after an induction period. In the following, the reaction temperature of 80° C. was maintained and the reaction pressure of 17.0 bar absolute was maintained by feeding TFE, VDF and PMVE into the gas phase with a feeding ratio PMVE (kg)/VDF (kg) of 0.729 and a feeding ratio TFE (kg)/VDF (kg) of 0.221. When a feed of 250 g VDF was reached, 150 g of a blend of 100 g PPVE-3 and 35 g 1,4-diiodoperfluorbutane were slowly fed from the top of the reactor using an aerosol nozzle. The feed of the blend was completed when a feed of 965 g VDF had been reached. Another portion of 5 ml 2.0% aqueous ammonium persulfate (APS) solution was added into the reactor after every 60 minutes of reaction time. The monomer feed of VDF, TFE and PMVE was continued until a total feed of 3750 g VDF had been reached (after 365 min) Then the monomer valves were closed and the remaining monomers were reacted down to a pressure of 11.8 bars, which took 30 minutes. The reactor was vented and flushed with $N_2$ in three cycles. The resulting polymer dispersion having a solid content of 20.6% and latex particles having a z-average diameter of 95 nm (according to dynamic light scattering) was removed at the bottom of the reactor. 3000 ml of the dispersion was freeze coagulated at −18° C. in a refrigerator overnight. After defrosting, the sponge-like raw gum was washed five times with deionized water under vigorous agitation and then dried in an oven at 130° C. for 12 hours. The resulting polymer had the physical properties listed in Table 1 below.

TABLE 1

| Property | Result |
| --- | --- |
| reduced viscosity (MEK@35° C.) | 65 ml/g |
| ML 1 + 10 @ 121° C. | 25 |
| glass transition temp. | −30.8° C. |
| iodine content by elemental anal. | 0.22 m/m % |
| [—$CF_2$—$CH_2$—I]/[—$CF_2$—$CH_2$—OH] | 29 |

Reference Example 1: Preparation with Fluorinated Emulsifier

The polymerization of Example 1 was repeated under the same conditions as described above. As the only exception, the Glucopon 600 CS UP surfactant was replaced by 230 g of the partially fluorinated emulsifier $CF_3$—O—$(CF_2)_3$—O—$CF_2CH_2COONH_4$, present in an aqueous solution with 30 wt % surfactant. The monomer feed period took 410 min to give a polymer dispersion with a solid content of 20.5 wt % and an average particle size of 117 nm. The resulting polymer had the properties shown in Table 2 below.

TABLE 2

| Property | Result |
| --- | --- |
| reduced viscosity (MEK@35° C.) | 64 ml/g |
| ML 1 + 10 @ 121° C. | 24 |
| glass transition temp. | −30.7° C. |
| iodine content by elemental anal. | 0.23 m/m % |
| [—$CF_2$—$CH_2$—I]/[—$CF_2$—$CH_2$—OH] | 32 |

The comparison of this reference example with example 1 shows that the polymerization with the polyhydroxy emulsifiers is comparable to the polymerization with fluorinated emulsifiers when it comes to the properties of the resulting polymers.

Reference Example 2: (Preparation without any Emulsifier)

The polymerization of Example 1 was repeated under the same conditions as described above. As the only exception, no surfactant at all was used herein. The reaction took 535 min to result in a polymer dispersion with a solid content of 14 wt % and an average particle size of 482 nm. The resulting polymer showed the following physical characteristics listed in Table 1 below.

TABLE 3

| Property | Result |
| --- | --- |
| reduced viscosity (MEK@35° C.) | 34 ml/g |
| ML 1 + 10 @ 121° C. | 2 |
| glass transition temp. | −30.9° C. |
| iodine content by elemental anal. | 0.17 m/m % |
| [—$CF_2$—$CH_2$—I]/[—$CF_2$—$CH_2$—OH] | 8 |

Example 2

Fluoroelastomer compositions can be made on a two-roll mill by mixing 100 parts of the fluorinated polymer of example 1, 30 parts MT 990 (filler), 1 part acid acceptor (ZnO), 2.5 parts Trigonox 101-50D (organic peroxide, from AKZO), 4.3 parts Luvomaxx TAIC DL 70 (70% triallylisocyanurate on silica carrier from Lehmann & Voss) and 0.8 parts Struktol WS 280 (process aid based on organosilicone from Schill+Seilacher). The curable composition can be press-cured and post cured according to the conditions as described herein.

List of Particular Embodiments

1. Method of making a curable fluoropolymer comprising repeating units derived from vinylidenfluoride (VDF) and at least one perfluorinated monomer selected from hexafluoropropene (HFP), tetrafluoroethene (TFE), a perfluorovinyl ether (PAVE), a perfluoroallylether (PAAVE) or a combination thereof said method comprising polymerizing the monomers in an aqueous medium in a radical reaction containing one or more reaction initiators, one or more chain transfer agent containing one or more halogens selected from iodine, bromine or a combination thereof and one or more non-fluorinated aliphatic polyhydroxy emulsifier containing at least one polyhydroxy unit having at least two adjacent hydroxyl groups and at least one long chain unit containing from 4 to 40 carbon atoms and, wherein the polymerization is carried out without adding a fluorinated emulsifier.
2. The method of embodiment 1 wherein the at least one polyhydroxy unit is cyclic.
3. The method of embodiment 1 wherein the at least one polyhydroxy unit is cyclic and contains at least one six-membered ring or at least one five-membered ring.
4. The method of embodiment 1 wherein the polyhydroxy emulsifier is selected from alkylglycosides and alkylpolyglycosides.
5. The method of embodiment 1 wherein the polyhydroxy emulsifier is a (poly)glucoside according to the formula

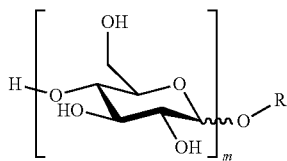

wherein m represents an integer of from 1 to 10, and R represents a long chain unit.
6. The method of embodiment 5 wherein R represents a hydrocarbon chain that may be interrupted by one or more (ether) oxygen atoms and contains from 2 to 26, preferably from 8 to 22 carbon atoms.
7. The method of embodiment 1 wherein the at least one polyhydroxy unit is acyclic.
8. The method of embodiment 1 wherein the at least one non-fluorinated aliphatic polyhydroxy emulsifier is represented by the general formula (III):

$$R^1—C(=O)—N(R^3)—Z \quad (III)$$

wherein $R^3$ is H or a linear or branched aliphatic residue containing from 1 to 8 carbon atoms, preferably $R^3$ is H or a $C_1$-$C_4$ hydrocarbyl or hydroxyhydrocarbyl, wherein the carbon chain of the aliphatic residue may optionally be interrupted by one or more than one catenary oxygen (ether) atoms and wherein $R^1$ represents a linear or branched aliphatic residue containing from 5 to 31 carbon atoms, preferably a $C_5$-$C_{31}$ hydrocarbyl moiety and Z represents an acyclic polyhydroxy hydrocarbyl moiety having at least 2 or at least 3 hydroxy groups directly bonded to the carbon chain.
9. The method of embodiment 8 wherein Z contains an acyclic unit represented by the general formula $—(CHOH)_n—$ more preferably $—(CHOH)_n—CH_2OH$, wherein n represents an integer of from 2 up to and including 8.
10. The method according to any one of the preceding embodiments wherein the polymerization is carried out in the presence of up to 1.0% by weight based on the total amount of monomers of a modifier selected from perfluorinated bisolefinic ethers represented by the general formula:

wherein n and m are independent from each other either 1 or 0 and wherein Rf represents a perfluorinated linear or branched, cyclic or acyclic aliphatic or aromatic hydrocarbon residue that may be interrupted by one or more oxygen atoms and comprising up to 30 carbon atoms.
11. The method according to any one of the preceding embodiments wherein the chain transfer agent is selected from a polyiodoalkane, a polyiodofluoroalkane or a polyiodoperfluoroalkane.
12. The method of any one of the preceding embodiments wherein the chain transfer agent is selected from alpha-omega diiodo alkanes, alpha-omega diiodo fluoroalkanes and alpha-omega diiodo perfluoroalkanes having from 1 to 12 carbon atoms.
13. The method according to any one of the preceding embodiments wherein the polymerization is carried out in the presence of an iodine-containing cure-site monomer.
14. The method according to any one of the preceding embodiments wherein the curable polymer contains from 14 to 80% wt of VDF.
15. The method according to any one of the preceding embodiments wherein the curable fluoropolymer contains from about 0.1 to about 0.6% wt of iodine based on the total weight of the polymer.
16. The method according to any one of the preceding embodiments wherein the curable fluoropolymer has a $—CF_2CH_2I$ to $—CF_2CH_2OH$ group ratio of at least 15.
17. The method according to any one of the preceding embodiments wherein the curable fluoropolymer has a $—CF_2CH_2I$ to $—CF_2CH_2OH$ group ratio of from 15 to 50, or between 25 and 45.
18. The method according to any one of the preceding embodiments wherein the curable fluoropolymer is present in an aqueous dispersion and has a Z-average particle size of from about 20 to about 300 nm.
19. The method according to any one of the preceding embodiments wherein the curable fluoropolymer has a Mooney viscosity (ML 1+10 at 121° C.) of from about 20 to about 80.
20. A curable fluoropolymer obtainable by the method according to any one of the preceding embodiments.
21. The curable fluoropolymer of embodiment 20 being in the form of an aqueous dispersion.
22. A cured fluoropolymer obtained by curing the polymer of embodiment 20 in the presence of a peroxide curing agent.
23. An article containing the cured fluoropolymer obtainable by curing the fluoropolymer of embodiment 20.

24. A composition comprising a non-fluorinated aliphatic polyhydroxy emulsifier and a curable fluoropolymer having a Mooney viscosity (ML 1+10 at 121° C.) of from about 20 to about 80; a —$CF_2CH_2I$ to —$CF_2CH_2OH$ group ratio of at least 15, or between 15 and 50, and wherein the curable fluoropolymer contains from about 0.1 to about 0.6% wt of iodine based on the total weight of the polymer and wherein the curable polymer comprises repeating units derived from vinylidenfluoride (VDF) and at least one perfluorinated monomer selected from hexafluoropropene (HFP), tetrafluoroethene (TFE), a perfluorovinyl ether (PAVE), a perfluoroallylether (PAAVE) or a combination thereof, and wherein the one or more non-fluorinated aliphatic polyhydroxy emulsifier contains at least one polyhydroxy unit having at least two adjacent hydroxyl groups and at least one long chain unit containing from 4 to 40 carbon atoms and wherein the composition comprises no fluorinated emulsifier.

25. The compositions of embodiment 24 wherein the polymer contains from 14 to 80% wt of vinylidenefluoride comonomer.

26. The composition of embodiment 24 or 25 wherein the non fluorinated aliphatic polyhydroxy emulsifier is as defined in any one of embodiments 2 to 9.

The invention claimed is:

1. Method of making a curable fluoropolymer comprising (i) repeating units derived from vinylidene fluoride and (ii) at least one perfluorinated monomer selected from hexafluoropropene, tetrafluoroethene, a perfluorovinyl ether, a perfluoroallylether, and a combination thereof, said method comprising polymerizing the monomers in an aqueous medium in a radical reaction containing (a) a first material selected from one or more reaction initiators, one or more chain transfer agent containing one or more halogens selected from iodine, bromine and a combination thereof, and (b) one or more non-fluorinated aliphatic polyhydroxy emulsifier containing at least one polyhydroxy unit having at least two adjacent hydroxyl groups and at least one long chain unit containing from 4 to 40 carbon atoms and, wherein the polymerization is carried out without adding a fluorinated emulsifier; and wherein the curable fluoropolymer has a $CF_2CH_2I$ to $CF_2CH_2OH$ group ratio of at least 10.

2. The method of claim 1 wherein the at least one polyhydroxy unit is cyclic and contains a six-membered ring and/or a five-membered ring.

3. The method of claim 1 wherein the polyhydroxy emulsifier is selected from alkyl(poly)glycosides, alkyoxy(poly)glycosides, polyoxyalkyl(poly)glycosides, and combinations thereof.

4. The method of claim 1 wherein the polyhydroxy emulsifier is selected from alkylglucosides according the general formula

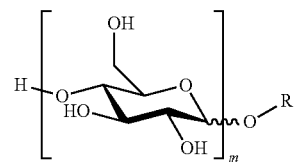

wherein m represents an integer of from 1 to 10, and R represents an alkyl chain that may be interrupted by one or more oxygen atoms.

5. The method according claim 1 wherein the at least one polyhydroxy unit is acyclic.

6. The method of claim 5 wherein the at least one non-fluorinated aliphatic polyhydroxy emulsifier is represented by the general formula (III):

$$R^1—C(=O)—N(R^3)—Z \qquad (III)$$

wherein $R^3$ is H or a linear or branched aliphatic residue containing from 1 to 8 carbon atoms, wherein the carbon chain of the aliphatic residue may optionally be interrupted by one or more than one ether oxygen atom and wherein $R^1$ represents a linear or branched aliphatic residue containing from 5 to 31 carbon atoms, and Z represents an acyclic polyhydroxy hydrocarbyl moiety having at least 2 hydroxy groups directly bonded to the carbon chain.

7. The method of claim 6 wherein Z contains an acyclic unit represented by the general formula $$—(CHOH)_n—,$$

wherein n represents an integer of from 2 up to and including 8.

8. The method of claim 1 wherein the chain transfer agent is selected from (a) alpha-omega diiodo alkanes, (b) alpha-omega diiodo fluoroalkanes and (c) alpha-omega diiodo perfluoroalkanes, each of (a) through (c) having from 1 to 12 carbon atoms.

9. The method of claim 1 wherein the polymerization is carried out in the presence of an iodine-containing cure-site monomer.

10. The method of claim 1 wherein the curable polymer contains from 14 to 80% wt of vinylidene fluoride comonomer.

11. The method of claim 1 wherein the curable fluoropolymer contains from about 0.1 to about 0.6% wt of iodine based on the total weight of the polymer.

12. The method of claim 1 wherein the curable fluoropolymer is present in an aqueous dispersion and has a Z-average particle size of from about 20 to about 300 nm.

13. The method of claim 1 wherein the curable fluoropolymer has a Mooney viscosity (ML 1+10 at 121° C.) of from about 20 to about 80.

* * * * *

UNITED STATES PATENT AND TRADEMARK OFFICE
CERTIFICATE OF CORRECTION

PATENT NO. : 10,087,307 B2
APPLICATION NO. : 15/033301
DATED : October 2, 2018
INVENTOR(S) : Kai Helmut Lochhaas It is certified that error appears in the above-identified patent and that said Letters Patent is hereby corrected as shown below:

On the Title Page

<u>Column 1</u>
(72) Inventors: Arnd Kruz, delete "Kruz" and insert -- Kurz --, therefor.

In the Claims

<u>Column 25</u>
Line 43, In Claim 1, delete "$CF_2CH_2I$" and insert -- —$CF_2CH_2I$ --, therefor.
Line 44, In Claim 1, delete "$CF_2CH_2OH$" and insert -- —$CF_2CH_2OH$ --, therefor.

Signed and Sealed this
Fifteenth Day of September, 2020

Andrei Iancu
*Director of the United States Patent and Trademark Office*